United States Patent
Chu et al.

(10) Patent No.: US 9,853,902 B2
(45) Date of Patent: Dec. 26, 2017

(54) METHOD AND SYSTEM FOR IMPLEMENTING X2 PROXY

(71) Applicant: ZTE Corporation, Shenzhen, Guangdong (CN)

(72) Inventors: Li Chu, Shenzhen (CN); Yin Gao, Shenzhen (CN); Yunlu Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 95 days.

(21) Appl. No.: 14/764,901

(22) PCT Filed: Dec. 31, 2013

(86) PCT No.: PCT/CN2013/091259
§ 371 (c)(1),
(2) Date: Aug. 31, 2015

(87) PCT Pub. No.: WO2014/117630
PCT Pub. Date: Aug. 7, 2014

(65) Prior Publication Data
US 2015/0372925 A1   Dec. 24, 2015

(30) Foreign Application Priority Data
Jan. 30, 2013   (CN) .......................... 2013 1 0037580

(51) Int. Cl.
*H04L 12/801* (2013.01)
*H04W 92/20* (2009.01)
(Continued)

(52) U.S. Cl.
CPC .......... *H04L 47/17* (2013.01); *H04L 41/0631* (2013.01); *H04L 47/14* (2013.01);
(Continued)

(58) Field of Classification Search
None
See application file for complete search history.

(56) References Cited

U.S. PATENT DOCUMENTS 7,190,668 B1 * 3/2007 Francis ............... H04L 12/2856
370/229
9,603,060 B2 * 3/2017 Maeda ............. H04W 36/0016
(Continued)

FOREIGN PATENT DOCUMENTS

| CN | 102469439 A | 5/2012 |
|---|---|---|
| WO | 2011160924 A1 | 12/2011 |

OTHER PUBLICATIONS

CATT, Offline discussion on mobile relay architecture options, 3GPP TSG RAN WG3#75 R3-120423, 3GPP, mailed on Feb. 6, 2012.

(Continued)

*Primary Examiner* — Steven H Nguyen
(74) *Attorney, Agent, or Firm* — Oppedahl Patent Law Firm LLC

(57) ABSTRACT

Disclosed are a method and system for implementing an X2 proxy. The method includes that a function of a next-hop node serving as an X2 proxy of a previous-hop node (300) is activated; and X2 message interaction between an initial node and a target node is implemented through more than one X2 proxy including the previous-hop node and the next-hop node (301).

14 Claims, 7 Drawing Sheets

A function of a next-hop node serving as an X2 proxy of a previous-hop node is activated — 300

X2 message interaction between an initial node and a target node is implemented through more than one X2 proxY including the previous-hop node and the next-hop node — 301

(51) Int. Cl.
*H04L 12/24* (2006.01)
*H04W 36/22* (2009.01)
*H04W 40/04* (2009.01)
*H04W 72/04* (2009.01)
*H04W 24/08* (2009.01)
*H04W 36/00* (2009.01)
*H04W 84/00* (2009.01)
*H04W 84/04* (2009.01)

(52) U.S. Cl.
CPC .......... *H04W 36/22* (2013.01); *H04W 40/04* (2013.01); *H04W 72/04* (2013.01); *H04W 92/20* (2013.01); *H04W 24/08* (2013.01); *H04W 36/0033* (2013.01); *H04W 84/005* (2013.01); *H04W 84/047* (2013.01)

(56) References Cited

U.S. PATENT DOCUMENTS

| | | | |
|---|---|---|---|
| 2009/0207855 A1* | 8/2009 | Watanabe | H04L 69/22 370/466 |
| 2010/0296448 A1 | 11/2010 | Vainikka | |
| 2011/0044279 A1* | 2/2011 | Johansson | H04W 92/20 370/329 |
| 2011/0080890 A1* | 4/2011 | Cai | H04W 36/0033 370/331 |
| 2011/0080891 A1* | 4/2011 | Cai | H04W 36/0033 370/331 |
| 2011/0194535 A1* | 8/2011 | Johansson | H04W 28/24 370/331 |
| 2011/0270994 A1 | 11/2011 | Ulupinar | |
| 2012/0093125 A1* | 4/2012 | Hapsari | H04W 36/0016 370/331 |
| 2012/0099516 A1* | 4/2012 | Hapsari | H04W 36/06 370/315 |
| 2012/0115480 A1* | 5/2012 | Takahashi | H04W 36/0055 455/436 |
| 2012/0263096 A1* | 10/2012 | Masini | H04W 36/10 370/315 |
| 2013/0044639 A1* | 2/2013 | Wang | H04B 7/155 370/254 |
| 2013/0208649 A1* | 8/2013 | Waldhauser | H04W 36/0055 370/315 |
| 2014/0010204 A1* | 1/2014 | Xu | H04W 36/0033 370/331 |
| 2014/0064246 A1* | 3/2014 | Baillargeon | H04L 61/2592 370/331 |
| 2014/0134942 A1* | 5/2014 | Yu | H04W 24/02 455/7 |
| 2014/0135006 A1* | 5/2014 | Yu | H04W 36/0055 455/436 |
| 2014/0135007 A1* | 5/2014 | Yu | H04W 36/00 455/436 |
| 2014/0135008 A1* | 5/2014 | Yu | H04W 36/0077 455/436 |
| 2014/0206352 A1* | 7/2014 | Mochizuki | H04W 60/04 455/435.1 |

OTHER PUBLICATIONS

'3rd Generation Partnership Project;Technical Specification Group Radio Access Network; Mobile Relay for Evolved Universal Terrestrial Radio Access (E-UTRA); (Release 12)', 3GPP Standard; 3GPP TR 36.836,3rd Generation Partnership Project (3GPP),Mobile Competence Centre ; 650, Route Deslucioles ; F-06921 Sophia-Antipolis Cedex; France, vol. RAN WG3, No. V2.0.I, Oct. 8, 2012 , pp. 1-35, XP050650331.

Nokia Siemens Networks: "Further discussion on scenario and requirements for mobile relays",3GPP Draft; R3-112861 Scenario and Requirements for Mobile Relay, 3rd Generation Partnership Project (3GPP),Mobile Competence Centre ; 650, Route Deslucioles ; F-06921 Sophia-Antipolis Cedex; France, vol. RAN WG3, no. San Francisco, CA, USA;Nov. 14, 2011-Nov. 18, 2011,Nov. 4, 2011 (Nov. 4, 2011),XP050566080.

Ericsson:"Architecture Options for Mobile RNs11",3GPP Draft; R3-120323, 3rd Generation Partnership Project (3GPP), Mobile Competence Centre ; 650, Route Deslucioles ; F-06921 Sophia-Antipolis Cedex; France, vol. RAN WG3, no. Dresden, Germany;Feb. 6, 2012-Feb. 10, 2012,Jan. 31, 2012 (Jan. 31, 2012), XP050566744.

ZTE: "Mobile relay architecture comparison from the perspective of handover",3GPP Draft; R3-120026—Mobile Relay Architecture Comparison From the Perspective of Handover, 3rd Generation Partnership Project (3GPP), Mobile Competence Centre ; 650, Route Deslucioles ; F-06921 Sophia-Antipolis Cedex; France,vol. RAN WG3, no. Dresden, Germany;Feb. 6, 2012-Feb. 10, 2012,Jan. 31, 2012 (Jan. 31, 2012), XP050566560.

Supplementary European Search Report in European application No. 13873445.4, dated Feb. 8, 2016.

International Search Report in international application No. PCT/CN2013/091259, dated Apr. 3, 2014.

English Translation of the Written Opinion of the International Search Authority in international application No. PCT/CN2013/091259, dated Apr. 3, 2014.

* cited by examiner

METHOD AND SYSTEM FOR IMPLEMENTING X2 PROXY

TECHNICAL FIELD

The present disclosure relates to a wireless cellular communication technology, and in particular to a method and system for implementing X2 proxy.

BACKGROUND

In order to meet growing requirements on broadband high-speed mobile access, the Third Generation Partnership Project (3GPP) puts forward a Long-Term Evolution Advance (LTE-Advanced) standard. LTE-Advanced is an evolution of Long-Term Evolution (LTE), keeps a core of LTE, and expands the frequency domain and the time domain on such a basis to fulfil the aims of increasing a spectrum utilization rate, improving system capacity and the like by adopting a series of technologies.

A wireless relay technology is one of technologies for LTE-Advanced, and aims to widen coverage of a cell, reduce dead areas in communication, balance a load, transfer a service of a hotspot and reduce transmitted power of User Equipment (UE). In the wireless relay technology, a Relay Node (RN) provides a function and service similar to those of an ordinary evolved Node B (eNB) for UE accessing the cell of the RN, and further accesses an eNB which serving the RN through a wireless interface like ordinary UE; and here, the eNB serving the RN may be called a Donor eNB (DeNB), and the DeNB is connected with a Mobility Management Entity (MME). As shown in FIG. 1, a DeNB has provided with Serving GateWay (S-GW) and Packet Data Network GateWay (P-GW) functions, and also has a relay GateWay (GW) function. When an RN accesses a DeNB, an MME may select a local S-GW and P-GW located in the DeNB for the RN, wherein the S-GW is responsible for data information transmission, forwarding, routing and the like between the DeNB and the P-GW as well as caching of a downlink data packet; and the P-GW is an anchor point of data bearer, and is responsible for data packet forwarding, analysis, legal monitoring and service-based charging and Quality of Service (QoS) control. A relay GW has an S1/X2 proxy function, and is responsible for processing related S1/X2 signalling of UE, distinguishing signalling of different UE and performing correct message processing. For example, there are multiple RN like RN1 in a fixed relay scenario, and the X2 proxy function is defined as follows: there is an X2 interface between a DeNB and RN1, there are also X2 interfaces between the DeNB and adjacent eNBs around or other RNs, and when the DeNB with a relay GW function receives an X2 message from RN1, the DeNB may determine the adjacent eNBs or RNs to which related X2 information is to be transmitted according to cell information in the X2 message; here, if the received X2 message contains a UE application layer protocol identifier, the DeNB allocates a new UE application layer protocol identifier to UE or replaces the UE application layer protocol identifier in the message with a UE application layer protocol identifier which has been allocated to the UE, and contains the new UE application layer protocol identifier in the X2 message sent to the other adjacent eNBs as the UE application layer protocol identifier allocated by the DeNB; correspondingly, when the DeNB with the relay GW function receives an X2 message from another eNB or another RN except RN1, the DeNB may determine whether to send the related X2 message to RN1 or not according to the cell information in the X2 message; and here, if the received X2 message contains the UE application layer protocol identifier, the DeNB allocates the new UE application layer protocol identifier to the UE or replaces the UE application layer protocol identifier contained in the message, and includes the new UE application layer protocol identifier into the X2 message sent to RN1 as the UE application layer protocol identifier allocated by the DeNB. For example, if the received X2 message indicates that RN1 is a target cell, the corresponding X2 message is sent to RN1. For example, if the received X2 message is an eNB configuration updating message, the eNB configuration updating message may further be sent to RN1. In such an X2 proxy manner, information transmission between an RN and another adjacent eNB or RN is implemented; wherein, S1/X2 signalling between the RN and the DeNB with the relay GW function is wirelessly born by the RN, and is routed and forwarded for transmission through an RN SGW/PGW.

Along with the large-scale construction and commissioning of high-speed railways, requirements on communication on trains continuously increase. A practical speed of a high-speed railway has reached 350 kilometers per hour at present, and it is difficult to meet a communication quality requirement of the high-speed railway by coverage of an existing network eNB under the influence of Doppler frequency shift, frequent cell handover, great penetration loss of a carriage of the high-speed railway and the like. Therefore, deployment of a relay node, called a Mobile Relay (MR), on the high-speed railway is put forward in the industry. FIG. 2 is a diagram of a deployment scenario of an MR, and as shown in FIG. 2, users such as UE1 and UE2 on a high-speed train directly communicate with a relatively still MR, and the MR may be switched between different DeNBs in a movement of the high-speed train, to avoid simultaneous handover of a great number of users in a carriage of the high-speed train, and ensure quality of communication between the UE and the MR. In addition, enhancing a backbone connection between the MR and the DeNB can better solve the abovementioned problem of the high-speed railway.

For an MR scenario, there have proposed multiple architectures at present, wherein in an architecture of an Alt2 reusing fixed scenario without relocation, i.e. an architecture where a DeNB has been provided with S-GW, P-GW and relay GW functions, when an MR accesses an initial DeNB, an X2 proxy manner may be reused for implementing X2 message transmission between the MR and another eNB. However, in such an architecture, along with the movement of the train, after the MR goes far away from the initial DeNB and is switched to another DeNB, a relay GW, RN and PGW of the MR may still reside in the initial DeNB, and because the initial DeNB is far away from a current position of the MR and there may not be any X2 interface between the initial DeNB and an adjacent eNB of the MR, an X2 proxy function of the initial DeNB may not be realized between the MR and the eNB under such a condition, which may cause influence on the X2 message transmission between the MR and the other eNB and further reduce user experiences.

In a Home evolved Node B (HeNB) scenario, when a HeNB performs information interaction with an adjacent eNB or HeNB through an X2 proxy, similar problems may appear, which causes influence on X2 message transmission between the HeNB and another eNB or HeNB. In the HeNB scenario, the X2 proxy may also be called an X2 GW, and has a function similar to that in the MR scenario.

SUMMARY

In order to solve the existing technical problem, the embodiments of the present disclosure provide a method and system for implementing an X2 proxy.

A method for implementing an X2 proxy is provided, which includes that:

a function of a next-hop node serving as an X2 proxy of a previous-hop node is activated; and X2 message interaction between an initial node and a target node is implemented through more than one X2 proxy including the previous-hop node and the next-hop node.

The step that the function of the next-hop node serving as the X2 proxy of the previous-hop node is activated may include that:

the function of the next-hop node serving as the X2 proxy of the previous-hop node is activated by including an activation instruction into a message in an X2 connection establishment between the previous-hop node and the next-hop node; or, the function of the next-hop node serving as the X2 proxy of the previous-hop node is activated by including at the initial node an activation instruction into a message in a handover from the previous-hop node to the next-hop node; or, the function of the next-hop node serving as the X2 proxy of the previous-hop node is activated by including an activation instruction into a message in an evolved Node B (eNB) configuration update performed by the previous-hop node and the next-hop node.

The step that the function of the next-hop node serving as the X2 proxy of the previous-hop node is activated by including the activation instruction into the message in the X2 connection establishment between the previous-hop node and the next-hop node may be implemented as follows:

the previous-hop node sends an X2 establishment request message containing the activation instruction of activating the function of the next-hop node serving as the X2 proxy of the previous-hop node to the next-hop node; and the next-hop node returns an X2 establishment response message to the previous-hop node after receiving the X2 establishment request message.

The handover may be an X2 handover, and the step that the function of the next-hop node serving as the X2 proxy of the previous-hop node is activated by including at the initial node the activation instruction into the message in the handover from the previous-hop node to the next-hop node may be implemented as follows:

the previous-hop node sends an X2 handover request message containing the activation instruction of activating the function of the next-hop node serving as the X2 proxy of the previous-hop node to the next-hop node;

the next-hop node returns an X2 handover response message to the previous-hop node after receiving the X2 handover request message; or, the initial node sends a Radio Resource Control (RRC) connection reconfiguration completion message containing the activation instruction of activating the function of the next-hop node serving as the X2 proxy of the previous-hop node to the next-hop node.

The handover may be an S1 handover, and the step that the function of the next-hop node serving as the X2 proxy of the previous-hop node is activated by including at the initial node the activation instruction into the message in the handover from the previous-hop node to the next-hop node may be implemented as follows:

the previous-hop node sends an S1 handover request message containing the activation instruction of activating the function of the next-hop node serving as the X2 proxy of the previous-hop node to the next-hop node sequentially through a source MME of the initial node and a target MME of the initial node;

the next-hop node returns an S1 handover response message to the previous-hop node sequentially through the target MME and the source MME after receiving the S1 handover request message; or, the initial node sends an RRC connection reconfiguration completion message containing the activation instruction of activating the function of the next-hop node serving as the X2 proxy of the previous-hop node to the next-hop node.

The step that the function of the next-hop node serving as the X2 proxy of the previous-hop node is activated by including the activation instruction into the message in the eNB configuration update performed by the previous-hop node and the next-hop node may be implemented as follows:

the previous-hop node sends an eNB configuration updating message containing the activation instruction of activating the function of the next-hop node serving as the X2 proxy of the previous-hop node to the next-hop node; and the next-hop node returns an eNB configuration updating confirmation message or an eNB configuration updating failure message to the previous-hop node after receiving the eNB configuration updating message.

The X2 establishment response message may contain an X2 proxy activation confirmation instruction;

the X2 handover response message may contain an X2 proxy activation confirmation instruction;

the S1 handover response message may contain an X2 proxy activation confirmation instruction;

the eNB configuration updating confirmation message may contain an X2 proxy activation confirmation instruction;

the eNB configuration updating failure message may contain an X2 proxy activation confirmation instruction.

The step that X2 message interaction between the initial node and the target node is implemented through more than one X2 proxy including the previous-hop node and the next-hop node may include that:

the initial node sends an X2 message to a first-hop node;

the first-hop node performs X2 proxy processing on the received X2 message, and sends a corresponding X2 message to a second-hop node, and the rest operation may be finished by analogy until a last-hop node performs X2 proxy processing on a received X2 message and sends a corresponding X2 message to the target node; and/or, the last-hop node performs X2 proxy processing on an X2 message received from the target node, and sends a corresponding X2 message to a last-second hop node, and the rest operation may be finished by analogy until the first-hop node performs X2 proxy processing on a received X2 message and sends a corresponding X2 message to the initial node.

The step that X2 proxy processing is performed on the received X2 message may include that:

a new application layer identifier is allocated to UE, and an application layer identifier of the UE in the received X2 message is replaced with the allocated application layer identifier; and/or, a source node identifier in the received X2 message is replaced with own node identifier; and/or, a source node Internet Protocol (IP) address in the received X2 message is replaced with own node IP address.

Types of the target node may include an eNB, an RN, an MR, an HeNB and a micro eNB.

The method may further include that:

the function of the next-hop node serving as the X2 proxy of the previous-hop node is deactivated.

The step that the function of the next-hop node serving as the X2 proxy of the previous-hop node is deactivated may include that:

the previous-hop node sends an X2 proxy releasing/deactivation request message containing a deactivation instruction of deactivating the function of the next-hop node serving as the X2 proxy of the previous-hop node to the next-hop node; or, the function of the next-hop node serving as the X2 proxy of the previous-hop node is deactivated by including the deactivation instruction into a message in the eNB configuration update performed by the previous-hop node and the next-hop node.

The method may further include that:

the next-hop node returns an X2 proxy releasing/deactivation response message to the previous-hop node after receiving the X2 proxy releasing/deactivation request message containing the deactivation instruction of deactivating the function of the next-hop node serving as the X2 proxy of the previous-hop node; or, the step that the function of the next-hop node serving as the X2 proxy of the previous-hop node is deactivated by including the deactivation instruction into a message in the eNB configuration update performed by the previous-hop node and the next-hop node may be implemented as follows:

the previous-hop node sends an eNB configuration updating message containing the deactivation instruction of deactivating the function of the next-hop node serving as the X2 proxy of the previous-hop node to the next-hop node; and the next-hop node returns an eNB configuration updating confirmation message or an eNB configuration updating failure message to the previous-hop node after receiving the eNB configuration updating message.

The X2 proxy releasing/deactivation response message may contain an X2 proxy deactivation confirmation instruction; or, the eNB configuration updating confirmation message may contain an X2 proxy deactivation confirmation instruction;

the eNB configuration updating failure message may contain an X2 proxy deactivation confirmation instruction.

A system for implementing X2 proxy is provided, which includes an initial node, a previous-hop node, a next-hop node and a target node, wherein the initial node is configured to implement X2 message interaction with the target node through more than one X2 proxy including the previous-hop node and the next-hop node of which a function of serving as an X2 proxy of the previous-hop node has been activated.

When the function of the next-hop node serving as the X2 proxy of the previous-hop node is activated by including an activation instruction into a message in an X2 connection establishment between the previous-hop node and the next-hop node, the previous-hop node may be configured to send an X2 establishment request message containing the activation instruction of activating the function of the next-hop node serving as the X2 proxy of the previous-hop node to the next-hop node, and receive an X2 establishment response message from the next-hop node; and the next-hop node is configured to return the X2 establishment response message to the previous-hop node after receiving the X2 establishment request message containing the activation instruction of activating the function of the next-hop node serving as the X2 proxy of the previous-hop node from the previous-hop node.

When the function of the next-hop node serving as the X2 proxy of the previous-hop node is activated by including at the initial node an activation instruction into a message in a handover from the previous-hop node to the next-hop node and the handover is an X2 handover, the previous-hop node may be configured to send an X2 handover request message containing the activation instruction of activating the function of the next-hop node serving as the X2 proxy of the previous-hop node to the next-hop node, and receive an X2 handover request message returned by the next-hop node;

the next-hop node is configured to return the X2 handover response message to the previous-hop node after receiving the X2 handover request message containing the activation instruction of activating the function of the next-hop node serving as the X2 proxy of the previous-hop node from the previous-hop node; or, the initial node is further configured to send an RRC connection reconfiguration completion message containing the activation instruction of activating the function of the next-hop node serving as the X2 proxy of the previous-hop node to the next-hop node;

the next-hop node is configured to receive the RRC connection reconfiguration completion message containing the activation instruction of activating the function of the next-hop node serving as the X2 proxy of the previous-hop node from the initial node.

When the function of the next-hop node serving as the X2 proxy of the previous-hop node is activated by including at the initial node the activation instruction into the message in the handover from the previous-hop node to the next-hop node and the handover is an S1 handover, the system may further include a source MME and a target MME, wherein the previous-hop node is configured to send an S1 handover request message containing the activation instruction of activating the function of the next-hop node serving as the X2 proxy of the previous-hop node to the next-hop node sequentially through the source MME and the target MME, and receive an S1 handover response message returned sequentially through the target MME and the source MME from the next-hop node;

the next-hop node is configured to return the S1 handover response message to the previous-hop node sequentially through the target MME and the source MME after receiving the S1 handover request message containing the activation instruction of activating the function of the next-hop node serving as the X2 proxy of the previous-hop node and sent by the previous-hop node sequentially through the source MME and the target MME; or, the initial node is further configured to send the RRC connection reconfiguration completion message containing the activation instruction of activating the function of the next-hop node serving as the X2 proxy of the previous-hop node to the next-hop node;

the next-hop node is configured to receive the RRC connection reconfiguration completion message containing the activation instruction of activating the function of the next-hop node serving as the X2 proxy of the previous-hop node from the initial node.

When the function of the next-hop node serving as the X2 proxy of the previous-hop node is activated by including an activation instruction into a message in an evolved Node B (eNB) configuration update performed by the previous-hop node and the next-hop node, the previous-hop node may be configured to send an eNB configuration updating message containing the activation instruction of activating the function of the next-hop node serving as the X2 proxy of the previous-hop node to the next-hop node, and receive an eNB configuration updating confirmation message or an eNB configuration updating failure message from the next-hop node; and the next-hop node is configured to return the eNB configuration updating confirmation message or the eNB configuration updating failure message to the previous-hop node after receiving the eNB configuration updating message containing the activation instruction of activating the function of the next-hop node serving as the X2 proxy of the previous-hop node from the previous-hop node.

When the function of the next-hop node serving as the X2 proxy of the previous-hop node is deactivated, the previous-hop node may be further configured to send an X2 proxy releasing/deactivation request message containing a deactivation instruction of deactivating the function of the next-hop node serving as the X2 proxy of the previous-hop node to the next-hop node;

the next-hop node is further configured to receive the X2 proxy releasing/deactivation request message containing the deactivation instruction of deactivating the function of the next-hop node serving as the X2 proxy of the previous-hop node from the previous-hop node; or, the previous-hop node is further configured to send an eNB configuration updating message containing the deactivation instruction of deactivating the function of the next-hop node serving as the X2 proxy of the previous-hop node to the next-hop node, and receive an eNB configuration updating confirmation message or an eNB configuration updating failure message from the next-hop node;

the next-hop node is further configured to return the eNB configuration updating confirmation message or the eNB configuration updating failure message to the previous-hop node after receiving the eNB configuration updating message containing the deactivation instruction of deactivating the function of the next-hop node serving as the X2 proxy of the previous-hop node from the previous-hop node.

The next-hop node is further configured to return an X2 proxy releasing/deactivation response message to the previous-hop node; and the previous-hop node is further configured to receive the X2 proxy releasing/deactivation response message from the next-hop node.

A computer storage medium is provided, which includes a group of instructions, wherein at least one processor is caused to execute the abovementioned method for implementing X2 proxy when the instructions are executed.

According to the method and system for implementing the X2 proxy in the embodiments of the present disclosure, the function of the next-hop node serving as the X2 proxy of the previous-hop node is activated; X2 message interaction between the initial node and the target node is implemented through more than one X2 proxy including the previous-hop node and the next-hop node; and in such a manner, X2 message interaction between the initial node and an adjacent target node which is not directly connected with the first-hop node due to the absence of an X2 interface or for other reasons can be effectively implemented.

BRIEF DESCRIPTION OF THE DRAWINGS

In the drawings (which may not be proportionally drawn), similar reference signs may describe similar parts in different figures. Similar reference signs with different letter suffixes may represent different examples of similar parts. The figures substantially show each embodiment discussed in the present disclosure as, not limited to, examples.

DETAILED DESCRIPTION

The present disclosure is further described below with reference to the drawings and specific embodiments in detail.

In each embodiment of the present disclosure: a function of a next-hop node serving as an X2 proxy of a previous-hop node is activated; and X2 message interaction between an initial node and a target node is implemented through more than one X2 proxy including the previous-hop node and the next-hop node.

Figure 1:
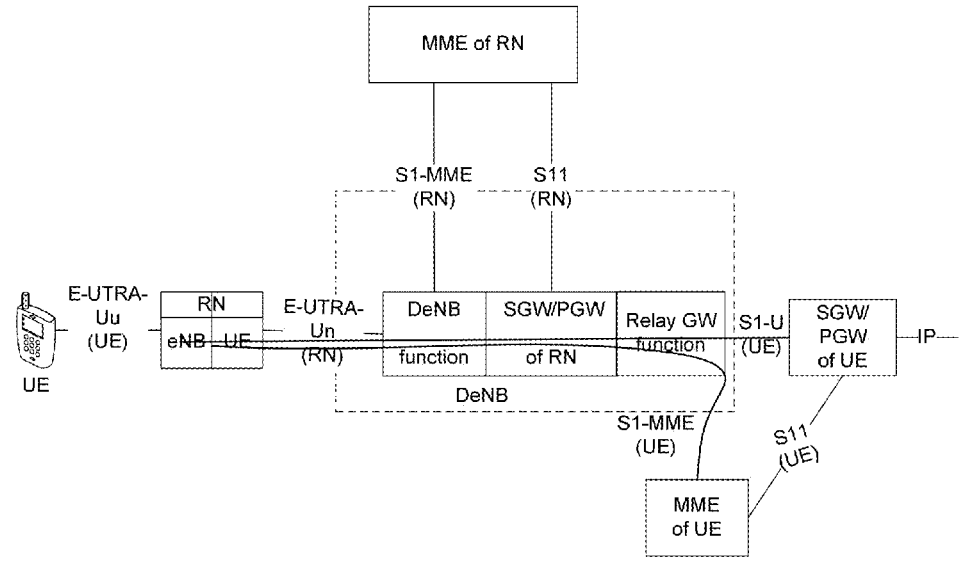
FIG. 1 is an architecture diagram of an RN.
Figure 2:
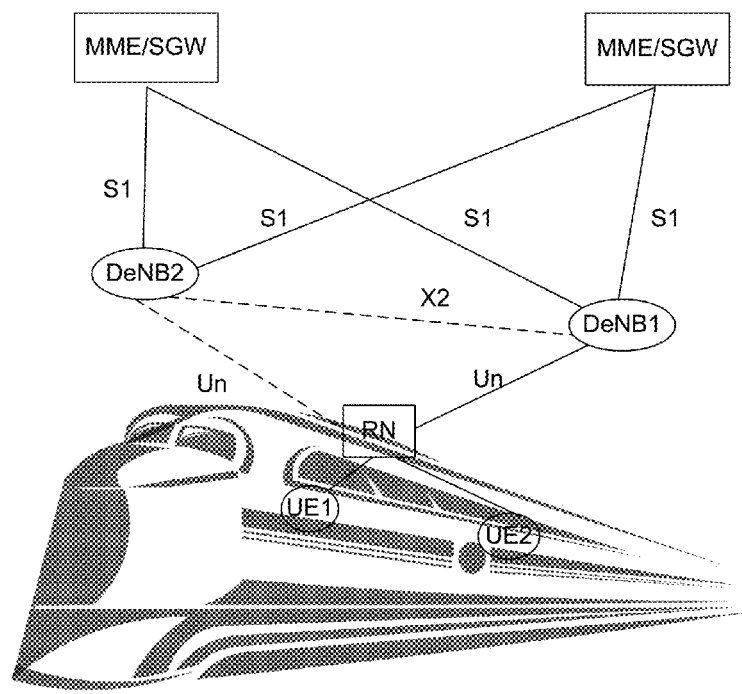
FIG. 2 is a diagram of a deployment scenario of an MR.
Figure 3:
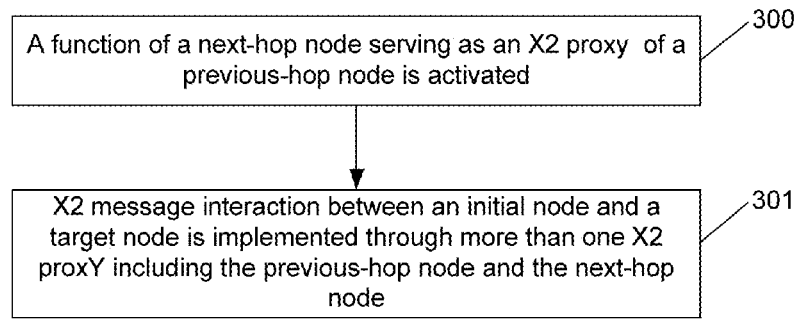
FIG. 3 is a flowchart of a method for implementing an X2 proxy according to an embodiment of the present disclosure.

An embodiment of the present disclosure provides a method for implementing an X2 proxy, and as shown in FIG. 3, the method includes the following steps:

Step 300: a function of a next-hop node serving as an X2 proxy of a previous-hop node.

Here, when the previous-hop node is a first-hop node, the next-hop node is a second-hop node; and correspondingly, when the previous-hop node is a second-hop node, the next-hop node is a third-hop node, and so on. The first-hop node, the second-hop node, . . . and a last-hop node refer to the first-hop node, the second-hop node, . . . and the last-hop node in a process of sending an X2 message to a target node by an initial node.

The step may specifically be implemented by the following steps:

the function of the next-hop node serving as the X2 proxy of the previous-hop node is activated by including an activation instruction into a message in an X2 connection establishment between the previous-hop node and the next-hop node; or, the function of the next-hop node serving as the X2 proxy of the previous-hop node is activated by including at the initial node an activation instruction into a message in a handover from the previous-hop node to the next-hop node; or, the function of the next-hop node serving as the X2 proxy of the previous-hop node is activated by including an activation instruction into a message in an evolved Node B (eNB) configuration update performed by the previous-hop node and the next-hop node, wherein the step that the function of the next-hop node serving as the X2 proxy of the previous-hop node is activated by including the activation instruction into the message in the X2 connection establishment between the previous-hop node and the next-hop node is specifically implemented as follows:

the previous-hop node sends an X2 establishment request message containing the activation instruction of activating the function of the next-hop node serving as the X2 proxy of the previous-hop node to the next-hop node; and the next-hop node returns an X2 establishment response message to the previous-hop node after receiving the X2 establishment request message.

Wherein, the X2 establishment response message may contain an X2 proxy activation confirmation instruction.

The handover is an X2 handover, and correspondingly, the step that the function of the next-hop node serving as the X2 proxy of the previous-hop node is activated by including at the initial node the activation instruction into the message in the handover from the previous-hop node to the next-hop node is specifically implemented as follows:

the previous-hop node sends an X2 handover request message containing the activation instruction of activating the function of the next-hop node serving as the X2 proxy of the previous-hop node to the next-hop node;

the next-hop node returns an X2 handover response message to the previous-hop node after receiving the X2 handover request message; or, the initial node sends an RRC connection reconfiguration completion message containing the activation instruction of activating the function of the next-hop node serving as the X2 proxy of the previous-hop node to the next-hop node to activate the function of the next-hop node serving as the X2 proxy of the previous-hop node.

Wherein, the Serving DeNB performs message interaction with the previous-hop node after receiving the RRC connection reconfiguration completion message, and activates its own X2 proxy function to make itself serve as an X2 proxy of the previous-hop node.

Wherein, the X2 handover response message may contain the X2 proxy activation confirmation instruction.

The handover is an S1 handover, and correspondingly, the step that the function of the next-hop node serving as the X2 proxy of the previous-hop node is activated by including at the initial node the activation instruction into the message in the handover from the previous-hop node to the next-hop node is specifically implemented as follows:

the previous-hop node sends an S1 handover request message containing the activation instruction of activating the function of the next-hop node serving as the X2 proxy of the previous-hop node to the next-hop node sequentially through a source MME of the initial node and a target MME of the initial node;

the next-hop node returns an S1 handover response message to the previous-hop node sequentially through the target MME and the source MME after receiving the S1 handover request message; or, the initial node sends an RRC connection reconfiguration completion message containing the activation instruction of activating the function of the next-hop node serving as the X2 proxy of the previous-hop node to the next-hop node to activate the X2 proxy function of the next-hop node to make the next-hop node serve as the X2 proxy of the previous-hop node.

Wherein, the next-hop node performs message interaction with the previous-hop node after receiving the RRC connection reconfiguration completion message, and activates own X2 proxy function to serve as the X2 proxy of the previous-hop node.

The S1 handover response message may contain the X2 proxy activation confirmation instruction.

The step that the function of the next-hop node serving as the X2 proxy of the previous-hop node is activated by including the activation instruction into the message in the eNB configuration update performed by the previous-hop node and the next-hop node is specifically implemented as follows:

the previous-hop node sends an eNB configuration updating message containing the activation instruction of activating the function of the next-hop node serving as the X2 proxy of the previous-hop node to the next-hop node; and the next-hop node returns an eNB configuration updating confirmation message or an eNB configuration updating failure message to the previous-hop node after receiving the eNB configuration updating message.

Wherein, the eNB configuration updating confirmation message may contain the X2 proxy activation confirmation instruction; and the eNB configuration updating failure message may contain the X2 proxy activation confirmation instruction.

After the function of the next-hop node serving as the X2 proxy of the previous-hop node is activated, the next-hop node serves as the X2 proxy of the previous-hop node and other node(s).

Step 301: X2 message interaction between the initial node and the target node is implemented through more than one X2 proxy including the previous-hop node and the next-hop node.

Here, the target node is a node which is not directly connected with the previous-hop node due to the absence of an X2 interface or for other reasons, wherein, the other reasons may specifically be overload and the like.

The step may specifically be implemented by the following steps:

the initial node sends an X2 message to a first-hop node;

the first-hop node performs X2 proxy processing on the received X2 message, and sends a corresponding X2 message to a second-hop node, and the rest operation may be finished by analogy until a last-hop node performs X2 proxy processing on a received X2 message and sends a corresponding X2 message to the target node; and/or, the last-hop node performs X2 proxy processing on an X2 message received from the target node, and sends a corresponding X2 message to the last-second hop node, and the rest operation may be finished by analogy until the first-hop node performs X2 proxy processing on a received X2 message and sends a corresponding X2 message to the initial node.

Wherein, the step that X2 proxy processing is performed on the received X2 message includes that:

a new application layer identifier is allocated to UE, and an application layer identifier of the UE in the received X2 message is replaced with the allocated application layer identifier; and/or, a source node identifier in the received X2 message is replaced with own node identifier; and/or, a source node IP address in the received X2 message is replaced with own node IP address.

The types of the target node may include: an eNB, an RN, an MR, an HeNB, a micro eNB and the like.

The method may further include that:

when the X2 proxy function is required to be released/deactivated, the function of the next-hop node serving as the X2 proxy of the previous-hop node is deactivated;

specifically, the previous-hop node sends an X2 proxy releasing/deactivation request message containing a deactivation instruction of deactivating the function of the next-hop node serving as the X2 proxy of the previous-hop node to the next-hop node to deactivate the function of the next-hop node serving as the X2 proxy of the previous-hop node; or, the function of the next-hop node serving as the X2 proxy of the previous-hop node is deactivated by including the deactivation instruction into a message in the eNB configuration update performed by the previous-hop node and the next-hop node;

here, an X2 proxy releasing/deactivation response message may contain an X2 proxy deactivation confirmation instruction.

Wherein, the next-hop node returns the X2 proxy releasing/deactivation response message to the previous-hop node after receiving the X2 proxy releasing/deactivation request message containing the deactivation instruction of deactivating the function of the next-hop node serving as the X2 proxy of the previous-hop node;

the step that the function of the next-hop node serving as the X2 proxy of the previous-hop node is deactivated by including the deactivation instruction into a message in the eNB configuration update performed by the previous-hop node and the next-hop node is specifically implemented as follows:

the previous-hop node sends an eNB configuration updating message containing the deactivation instruction of deactivating the function of the next-hop node serving as the X2 proxy of the previous-hop node to the next-hop node; and the next-hop node returns an eNB configuration updating confirmation message or an eNB configuration updating failure message to the previous-hop node after receiving the eNB configuration updating message.

Here, the eNB configuration updating confirmation message may contain the X2 proxy deactivation confirmation instruction; and the eNB configuration updating failure message may contain the X2 proxy deactivation confirmation instruction.

In the embodiment of the present disclosure, the function of the next-hop node serving as the X2 proxy of the previous-hop node is activated by including the activation instruction into the message in the X2 connection establishment between the previous-hop node and the next-hop node; or, the function of the next-hop node serving as the X2 proxy of the previous-hop node is activated by including at the initial node the activation instruction into the message in the handover from the previous-hop node to the next-hop node; or, the function of the next-hop node serving as the X2 proxy of the previous-hop node is activated by including the activation instruction into the message in the eNB configuration update performed by the previous-hop node and the next-hop node; and in such a manner, the function of the next-hop node serving as the X2 proxy of the previous-hop node can be effectively activated.

The present disclosure is further described below with reference to embodiments in detail.

Figure 4:
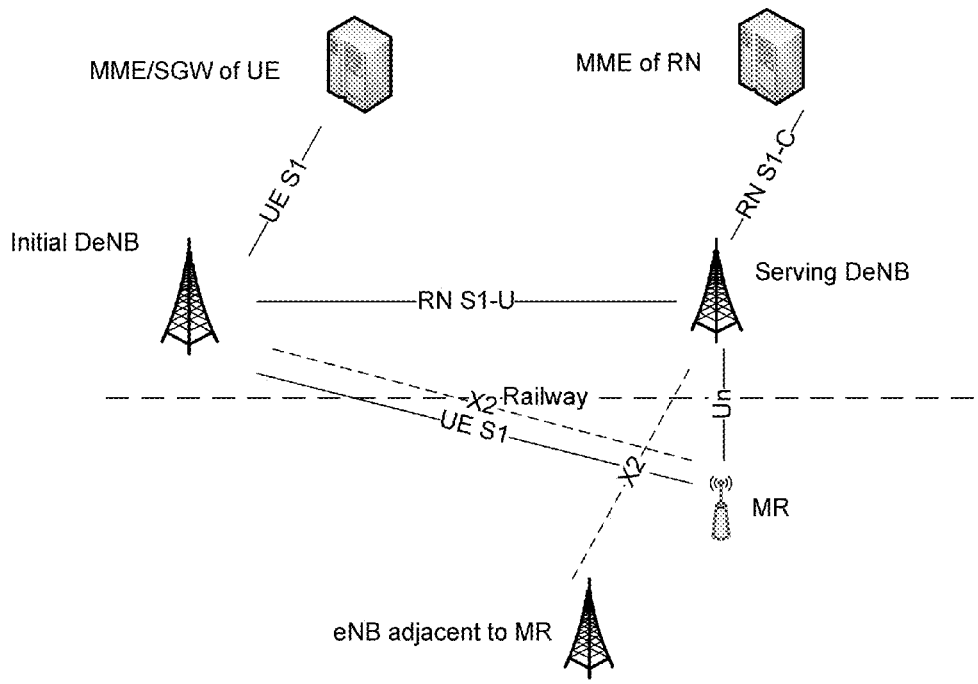
FIG. 4 is a diagram of an application scenario according to an embodiment of the present disclosure.

FIG. 4 is a diagram of an application scenario according to an embodiment of the present disclosure, and as shown in FIG. 4, an initial DeNB may not be directly connected with an eNB in a neighbouring region of an MR due to the absence of an X2 interface or for other reasons, there is an X2 interface between a serving DeNB and the eNB in the neighbouring MR, and there may be an X2 interface between the initial DeNB and the serving DeNB, or a condition of direct connection between the initial DeNB and the serving DeNB is met.

Here, it should be noted that embodiment 1 to embodiment 8 are described by taking two X2 proxies as an example, and specific processing processes for more than two X2 proxies are the same as those described in embodiment 1 to embodiment 8, and will not be repeated. Embodiment 1 to embodiment 8 are described by taking an MR scenario as an example, and a specific processing process of an HeNB scenario is the same as those described in embodiment 1, embodiment 2 and embodiment 5 to embodiment 8, and will not be repeated, wherein in the HeNB scenario, an HeNB is equivalent to an MR in the MR scenario, a first-hop X2 proxy is equivalent to an initial DeNB in the MR scenario, a second-hop X2 proxy is equivalent to a serving DeNB in the MR scenario, and other eNBs or HeNBs are equivalent to eNBs adjacent to the neighbouring MR in the MR scenario.

Embodiment 1

Figure 5:
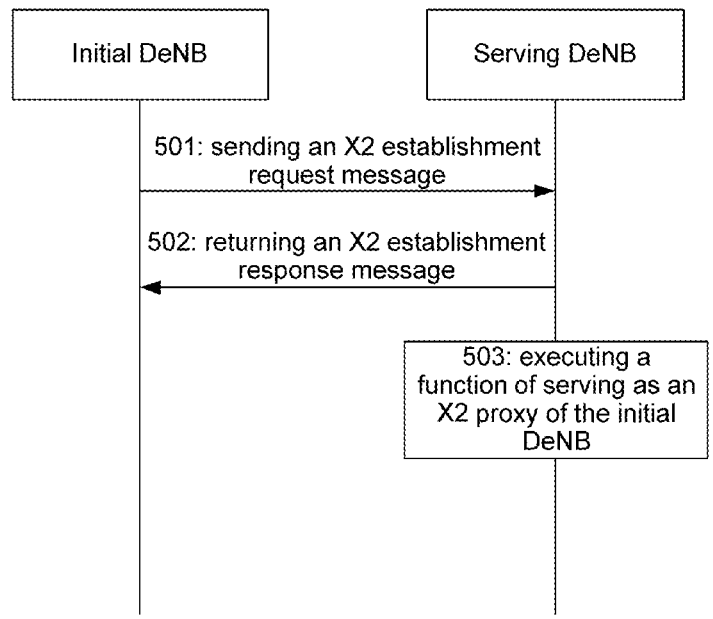
FIG. 5 is a flowchart of a method for implementing an X2 proxy according to embodiment 1 of the present disclosure.

In the embodiment, a multi-hop X2 proxy activation flow in an X2 connection establishment flow is initiated by an initial DeNB. As shown in FIG. 5, a method for implementing an X2 proxy according to the embodiment includes the following steps:

Step 501: the initial DeNB sends an X2 establishment request message to a serving DeNB.

Here, in the embodiment of the present disclosure, the timing for the initial DeNB to send the X2 establishment request message to the serving DeNB is not further limited.

The X2 establishment request message contains an X2 proxy activation instruction, wherein the X2 proxy activation instruction is an instruction of activating a function of serving as an X2 proxy of the initial DeNB.

Step 502: the serving DeNB returns an X2 establishment response message to the initial DeNB to confirm that X2 establishment succeeds after receiving the X2 establishment request message.

Here, the X2 establishment response message contains an X2 proxy activation confirmation or denial/failure instruction.

Wherein, if the serving DeNB determines after receiving the X2 establishment request message that the serving DeNB itself can serve as the X2 proxy of the initial DeNB according to its own condition, for example: a load condition and absence or presence of an X2 interface, the serving DeNB includes the X2 proxy activation confirmation instruction into the returned X2 establishment response message, and if the serving DeNB determines that the serving DeNB cannot serve as the X2 proxy of the initial DeNB according to its own condition, the serving DeNB includes the X2 proxy activation denial/failure instruction into the returned X2 establishment response message. Here, if the returned X2 establishment response message contains the X2 proxy activation denial/failure instruction, it is indicated that the serving DeNB cannot serve as the X2 proxy of the initial DeNB.

If X2 establishment fails, the serving DeNB may return an X2 establishment failure message to the initial DeNB to confirm that X2 establishment fails, wherein the X2 establishment failure message contains a failure reason, and here, the failure reason indicates that X2 proxy is not supported.

Step 503: after X2 establishment succeeds, the serving DeNB serves as the X2 proxy of the initial DeNB.

Embodiment 2

Figure 6:
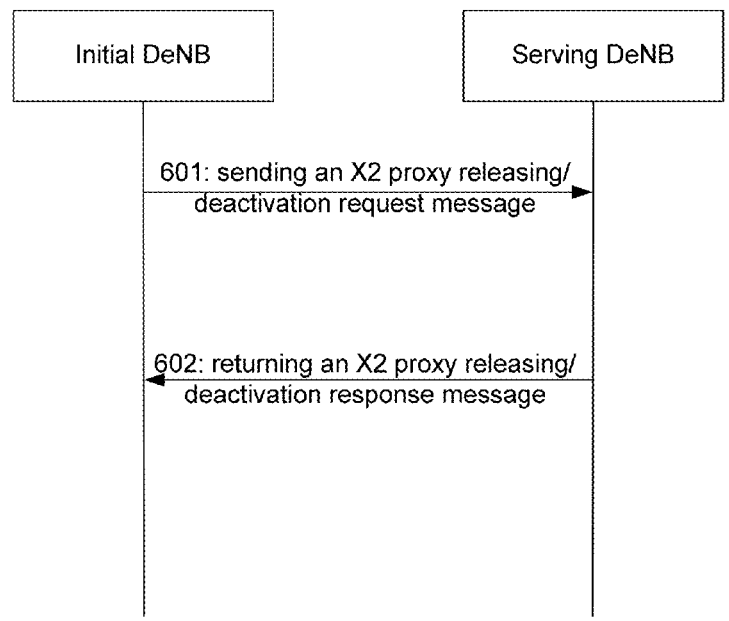
FIG. 6 is a flowchart of a method for releasing/deactivating an X2 proxy according to embodiment 2 of the present disclosure.

In the embodiment, a serving DeNB has activated a function of serving as an X2 proxy of an initial DeNB, and a multi-hop X2 proxy releasing/deactivation flow is initiated by the initial DeNB. As shown in FIG. 6, a method for releasing/deactivating an X2 proxy according to the embodiment includes the following steps:

Step 601: when an X2 proxy function is required to be released/deactivated, the initial DeNB sends an X2 proxy releasing/deactivation request message to the serving DeNB.

Here, the releasing/deactivation request message contains an X2 proxy deactivation instruction, wherein the X2 proxy deactivation instruction is a deactivation instruction of deactivating the function of serving as the X2 proxy of the initial DeNB.

Step 602: the serving DeNB returns an X2 proxy releasing/deactivation response message to the initial DeNB to confirm that X2 proxy deactivation succeeds after receiving the X2 proxy releasing/deactivation request message.

Here, the releasing/deactivation response message contains the X2 proxy deactivation confirmation instruction.

When the X2 proxy cannot be released/deactivated, the initial DeNB sends an X2 proxy releasing/deactivation failure message to the serving DeNB after receiving the X2 proxy releasing/deactivation request message, wherein the X2 proxy releasing/deactivation failure message contains a failure reason.

After the X2 proxy is released successfully, the serving DeNB may not execute the function of serving as the X2 proxy of the initial DeNB.

Embodiment 3

Figure 7:
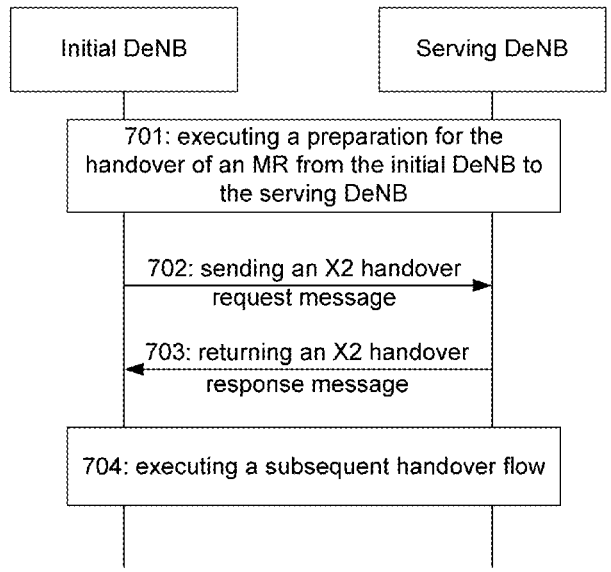
FIG. 7 is a flowchart of a method for implementing an X2 proxy according to embodiment 3 of the present disclosure.

As shown in FIG. 7, a method for implementing an X2 proxy according to the embodiment includes the following steps:

Step 701: when an X2 handover is required, a preparation flow for the handover of an MR from an initial DeNB to a serving DeNB is executed, and then Step 702 is executed.

Here, the preparation flow includes MR configuration measurement, MR measurement report, handover judgment by the initial DeNB and the like; and the step may specifically be implemented by adopting an existing technology.

Step 702: the initial DeNB sends an X2 handover request message to the serving DeNB.

Here, the X2 handover request message contains an X2 proxy activation instruction, wherein the X2 proxy activation instruction is an instruction of activating a function of serving as an X2 proxy of the initial DeNB.

Step 703: the serving DeNB returns an X2 handover response message to the initial DeNB after receiving the X2 handover request message.

Here, the X2 handover response message contains an X2 proxy activation confirmation or denial/failure instruction.

Wherein, if the serving DeNB determines after receiving the X2 establishment request message that the serving DeNB can serve as the X2 proxy of the initial DeNB according to its own condition, for example: a load condition and absence or presence of an X2 interface, the serving DeNB includes the X2 proxy activation confirmation instruction into the returned X2 handover response message, and if the serving DeNB determines that the serving DeNB cannot serve as the X2 proxy of the initial DeNB according to its own condition, the serving DeNB includes the X2 proxy activation denial/failure instruction into the returned X2 handover response message. Here, if the returned X2 handover response message contains the X2 proxy activation denial/failure instruction, it is indicated that the serving DeNB cannot serve as the X2 proxy of the initial DeNB.

After the serving DeNB determines that X2 handover is impossible, the serving DeNB returns an X2 handover failure message to the initial DeNB, wherein the X2 handover failure message contains the X2 proxy activation denial instruction.

Step 704: a subsequent handover flow is executed.

Here, the step may specifically be implemented by adopting the existing technology.

After X2 handover succeeds and the X2 proxy is confirmed to be activated, the serving DeNB serves as the X2 proxy of the initial DeNB.

It should be noted that the X2 proxy activation instruction described in Step 702 may further be included into an RRC connection reconfiguration completion message sent to the serving DeNB by the MR; the serving DeNB performs message interaction with the initial DeNB to activate its own function of serving as the X2 proxy of the initial DeNB after receiving the RRC connection reconfiguration completion message;

here, a message sent to the initial DeNB by the serving DeNB may contain the X2 proxy activation confirmation or denial/failure instruction.

Wherein, if the serving DeNB determines after the serving DeNB receives the RRC connection reconfiguration completion message that the serving DeNB can serve as the X2 proxy of the initial DeNB according to own condition, for example: the load condition and absence or presence of the X2 interface, the serving DeNB includes the X2 proxy activation confirmation instruction into the message sent to the initial DeNB, and if the serving DeNB determines that the serving DeNB cannot serve as the X2 proxy of the initial DeNB according to own condition, the serving DeNB includes the X2 proxy activation denial/failure instruction into the message sent to the initial DeNB. Here, if the message sent to the initial DeNB contains the X2 proxy activation denial/failure instruction, it is indicated that the serving DeNB cannot serve as the X2 proxy of the initial DeNB.

Embodiment 4

Figure 8:
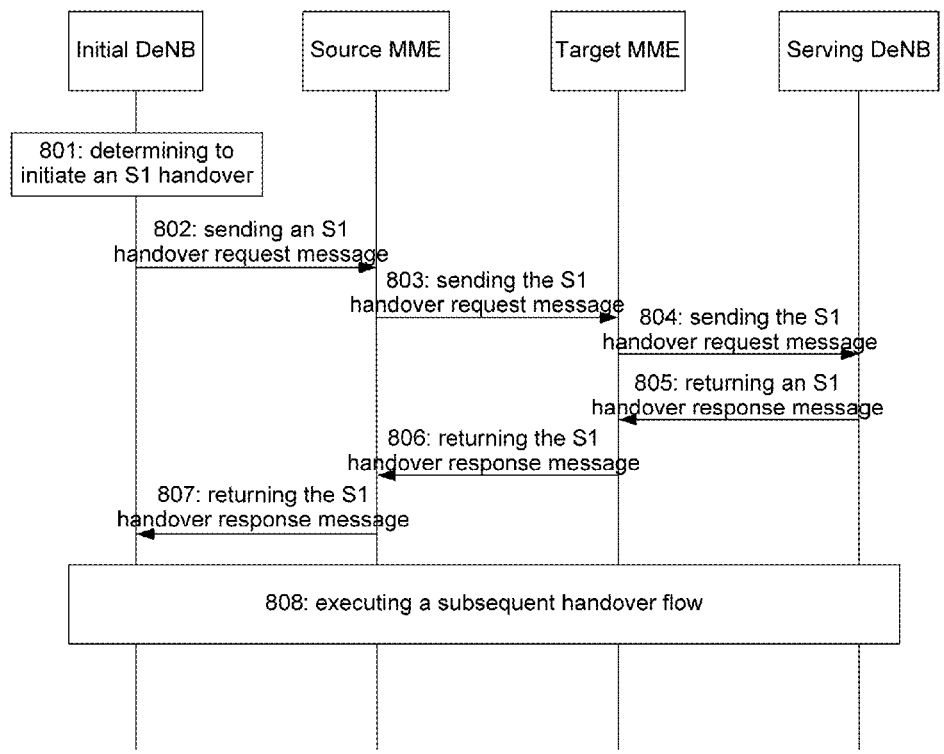
FIG. 8 is a flowchart of a method for implementing an X2 proxy according to embodiment 4 of the present disclosure.

As shown in FIG. 8, a method for implementing an X2 proxy according to the embodiment includes the following steps.

Step 801: an initial DeNB determines to initiate an S1 handover of an MR to a serving DeNB.

Step 802: the initial DeNB sends an S1 handover request message to a source MME of an RN.

Here, the S1 handover request message contains an X2 proxy activation instruction, wherein the X2 proxy activation instruction is an instruction of activating a function of serving as an X2 proxy of the initial DeNB.

Step 803: the source MME of the RN sends the S1 handover request message to a target MME of the RN after receiving the S1 handover request message.

Here, the S1 handover request message sent to the target MME of the RN contains the X2 proxy activation instruction, wherein the X2 proxy activation instruction is the instruction of activating the function of serving as the X2 proxy of the initial DeNB.

Step 804: the target MME of the RN sends the S1 handover request message to the serving DeNB after receiving the S1 handover request message.

Here, the S1 handover request message sent to the serving DeNB contains the X2 proxy activation instruction, wherein the X2 proxy activation instruction is the instruction of activating the function of serving as the X2 proxy of the initial DeNB.

Step 805: the serving DeNB returns an S1 handover response message to the target MME of the RN after receiving the S1 handover request message.

Here, the S1 handover response message contains an X2 proxy activation confirmation or denial/failure instruction.

Wherein, if the serving DeNB determines after the serving DeNB receives the 51 handover request message that the serving DeNB can serve as the X2 proxy of the initial DeNB according to own condition, for example: a load condition and absence or presence of an X2 interface, the serving DeNB includes the X2 proxy activation confirmation instruction into the returned S1 handover response message, and if the serving DeNB determines that the serving DeNB cannot serve as the X2 proxy of the initial DeNB according to own condition, the serving DeNB includes the X2 proxy activation denial/failure instruction into the returned S1 handover response message. Here, if the returned S1 handover response message contains the X2 proxy activation denial/failure instruction, it is indicated that the serving DeNB cannot serve as the X2 proxy of the initial DeNB.

After the serving DeNB determines that handover is impossible, the serving DeNB returns an S1 handover failure message to the target MME of the RN; correspondingly, the target MME of the RN returns the S1 handover failure message to the source MME of the RN; the source MME of the RN returns the S1 handover response message to the initial DeNB; and here, the S1 handover failure message contains the X2 proxy activation denial instruction.

Step 806: the target MME of the RN returns the S1 handover response message to the source MME of the RN after receiving the S1 handover response message.

Here, the S1 handover response message returned to the source MME of the RN contains the X2 proxy activation confirmation or denial/failure instruction.

Step 807: the source MME of the RN returns the S1 handover response message to the initial DeNB after receiving the S1 handover response message, and then Step 808 is executed.

Here, the S1 handover response message returned to the initial DeNB contains the X2 proxy activation confirmation or denial/failure instruction.

Step 808: a subsequent handover flow is executed.

Here, the step may specifically be implemented by adopting the existing technology.

After S1 handover succeeds and the X2 proxy is confirmed to be activated, the serving DeNB executes the function of serving as the X2 proxy of the initial DeNB.

It should be noted that the X2 proxy activation instruction described in Step 802 may further be contained in an RRC connection reconfiguration completion message sent to the serving DeNB by the MR; correspondingly, the serving DeNB performs message interaction with the initial DeNB to activate its own function of serving as the X2 proxy of the initial DeNB after receiving the RRC connection reconfiguration completion message;

here, a message sent to the initial DeNB by the serving DeNB may contain the X2 proxy activation confirmation or denial/failure instruction.

Wherein, if the serving DeNB determines after the serving DeNB receives the RRC connection reconfiguration completion message that the serving DeNB can serve as the X2 proxy of the initial DeNB according to its own condition, for example: the load condition and absence or presence of the X2 interface, the serving DeNB includes the X2 proxy activation confirmation instruction into the message sent to the initial DeNB, and if the serving DeNB determines that the serving DeNB cannot serve as the X2 proxy of the initial DeNB according to its own condition, the serving DeNB includes the X2 proxy activation denial/failure instruction into the message sent to the initial DeNB. Here, if the message sent to the initial DeNB contains the X2 proxy activation denial/failure instruction, it is indicated that the serving DeNB cannot serve as the X2 proxy of the initial DeNB.

Embodiment 5

Figure 9:
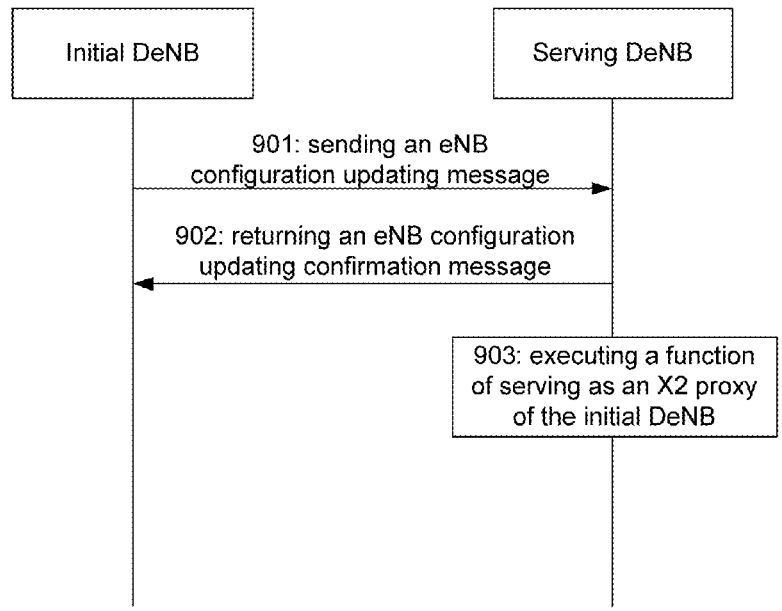
FIG. 9 is a flowchart of a method for implementing an X2 proxy according to embodiment 5 of the present disclosure.

As shown in FIG. 9, a method for implementing an X2 proxy according to the embodiment includes the following steps:

Step 901: when configuration updating is required, an initial DeNB sends an eNB configuration updating message to a serving DeNB.

Here, the eNB configuration updating message contains an X2 proxy activation instruction, and the X2 proxy activation instruction is an instruction of activating a function of serving as an X2 proxy of the initial DeNB.

Step 902: the serving DeNB returns an eNB configuration updating confirmation message to the initial DeNB after receiving the eNB configuration updating message.

Here, the eNB configuration updating confirmation message contains an X2 proxy activation confirmation or denial/failure instruction.

If the serving DeNB determines after the serving DeNB receives the eNB configuration updating message that the serving DeNB can serve as the X2 proxy of the initial DeNB according to own condition, for example: a load condition and absence or presence of an X2 interface, the serving DeNB includes the X2 proxy activation confirmation instruction into the returned eNB configuration updating confirmation message, and if the serving DeNB determines that the serving DeNB cannot serve as the X2 proxy of the initial DeNB according to own condition, the serving DeNB includes the X2 proxy activation denial/failure instruction into the returned eNB configuration updating confirmation message. Here, if the returned eNB configuration updating confirmation message contains the X2 proxy activation denial/failure instruction, it is indicated that the serving DeNB cannot serve as the X2 proxy of the initial DeNB.

When the serving DeNB determines that configuration updating is impossible after receiving the eNB configuration updating message, the serving DeNB returns an eNB configuration updating failure message to the initial DeNB, wherein the eNB configuration updating failure message contains the X2 proxy activation confirmation or denial/failure instruction.

Step 903: the serving DeNB executes the function of serving as the X2 proxy of the initial DeNB after confirming that the X2 proxy is activated.

Embodiment 6

Figure 10:
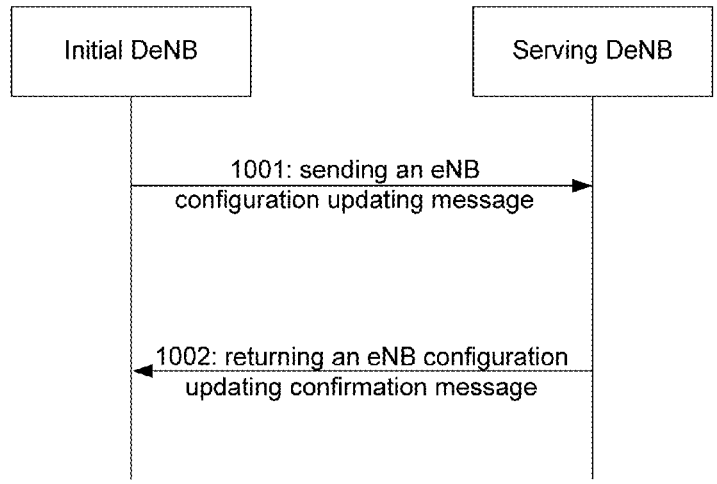
FIG. 10 is a flowchart of a method for deactivating an X2 proxy according to embodiment 6 of the present disclosure.

In the embodiment, a serving DeNB has activated a function of serving as an X2 proxy of an initial DeNB, and as shown in FIG. 10, a method for deactivating an X2 proxy according to the embodiment includes the following steps:

Step 1001: when X2 proxy deactivation is required, the initial DeNB sends an eNB configuration updating message to the serving DeNB.

Here, the eNB configuration updating message contains an X2 proxy deactivation instruction, wherein the X2 proxy deactivation instruction is a deactivation instruction of deactivating the function of serving as the X2 proxy of the initial DeNB.

Step 1002: the serving DeNB returns an eNB configuration updating confirmation message to the initial DeNB after receiving the eNB configuration updating message.

Here, the eNB configuration updating confirmation message contains an X2 proxy deactivation confirmation or denial/failure instruction.

If the serving DeNB determines after the serving DeNB receives the eNB configuration updating message that the function of serving as the X2 proxy of the initial DeNB can be deactivated according to own condition, for example: whether the serving DeNB is transmitting data as the X2 proxy or not, the serving DeNB includes the X2 proxy deactivation confirmation instruction into the returned eNB configuration updating confirmation message, and if the serving DeNB determines that the function of serving as the X2 proxy of the initial DeNB cannot be deactivated according to own condition, the serving DeNB includes the X2 proxy activation denial/failure instruction into the returned eNB configuration updating confirmation message.

The serving DeNB may further return an eNB configuration updating failure message to the initial DeNB after receiving the eNB configuration updating message; and here, the eNB configuration updating failure message contains the X2 proxy deactivation confirmation or denial/failure instruction, wherein, a triggering condition of returning the eNB configuration updating failure message to the initial DeNB by the serving DeNB may adopt the existing technology.

After X2 proxy deactivation succeeds, the serving DeNB may not execute the function of serving as the X2 proxy of the initial DeNB.

Embodiment 7

Figure 11:
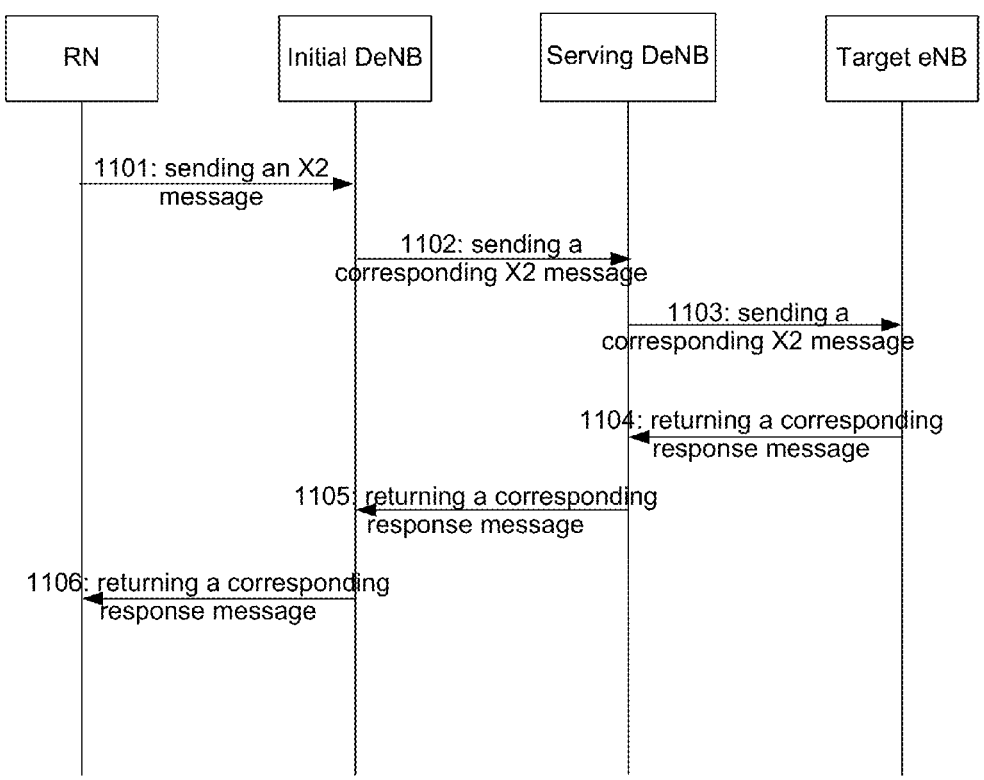
FIG. 11 is a flowchart of a method for implementing an X2 proxy according to embodiment 7 of the present disclosure.

In the embodiment, there is no X2 interface between an initial DeNB and a target eNB, the initial DeNB and a serving DeNB have activated X2 proxy functions, and specifically, the initial DeNB has activated a function of serving as an X2 proxy of an MR, and the serving DeNB has activated a function of serving as an X2 proxy of the initial DeNB. As shown in FIG. 11, a method for implementing an X2 proxy according to the embodiment includes the following steps:

Step 1101: the MR sends an X2 message to the initial DeNB.

Step 1102: after receiving the X2 message, the initial DeNB performs X2 proxy processing on the received X2 message, and sends a corresponding X2 message to the serving DeNB.

Here, the step that X2 proxy processing is performed on the received X2 message includes that: a new application layer identifier is allocated to UE, and an application layer identifier of the UE in the received X2 message is replaced with the allocated application layer identifier; and/or, a source node identifier in the received X2 message is replaced with own node identifier; and/or, a source node IP address in the received X2 message is replaced with own node IP address.

Step 1103: the serving DeNB performs X2 proxy processing on the received X2 message after receiving the X2 message sent by the initial DeNB, and sends a corresponding X2 message to the target eNB according to the target eNB in the message, and then Step 1104 is executed.

Here, the step that X2 proxy processing is performed on the received X2 message includes that: a new application layer identifier is allocated to the UE, and the application layer identifier of the UE in the received X2 message is replaced with the allocated application layer identifier; and/or, the source node identifier in the received X2 message is replaced with own node identifier; and/or, the source node IP address in the received X2 message is replaced with own node IP address.

Step 1104-1106: the target eNB returns a corresponding response message to the serving DeNB after receiving the X2 message; the serving DeNB returns a corresponding response message to the initial DeNB after receiving the response message returned by the target eNB; and the initial DeNB returns a corresponding response message to the MR after receiving the response message.

Embodiment 8

Figure 12:
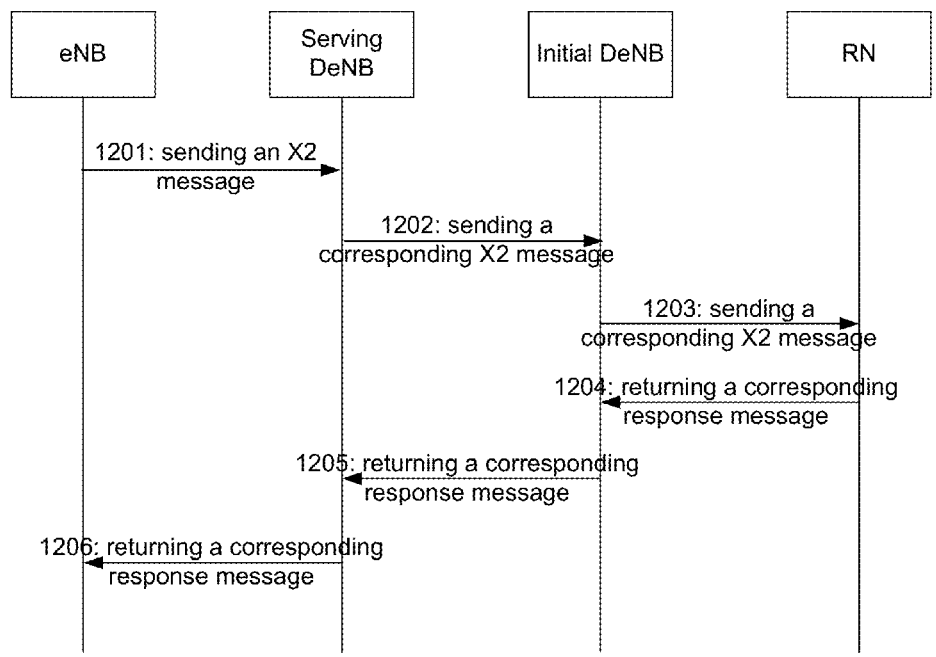
FIG. 12 is a flowchart of a method for implementing an X2 proxy according to embodiment 8 of the present disclosure.

In the embodiment, there is no X2 interface between a serving DeNB and an MR, an initial DeNB and the serving DeNB have activated X2 proxy functions, and specifically, the initial DeNB has activated a function of serving as an X2 proxy of the MR, and the serving DeNB has activated a function of serving as an X2 proxy of the initial DeNB. As shown in FIG. 12, a method for implementing an X2 proxy according to the embodiment includes the following steps:

Step 1201: another eNB except the initial DeNB sends an X2 message to the serving DeNB.

Step 1202: the serving DeNB performs X2 proxy processing on the received message after receiving the X2 message, and sends a corresponding X2 message to the initial DeNB.

Here, the step that X2 proxy processing is performed on the received X2 message includes that: a new application layer identifier is allocated to UE, and an application layer identifier of the UE in the received X2 message is replaced with the allocated application layer identifier; and/or, a source node identifier in the received X2 message is replaced with own node identifier; and/or, a source node IP address in the received X2 message is replaced with own node IP address.

Step 1203: the initial DeNB performs X2 proxy processing on the received X2 message after receiving the X2 message sent by the serving DeNB, and sends a corresponding X2 message to the MR according to the MR in the message, and then Step 1204 is executed.

Here, the step that X2 proxy processing is performed on the received X2 message includes that: a new application layer identifier is allocated to the UE, and the application layer identifier of the UE in the received X2 message is replaced with the allocated application layer identifier; and/or, the source node identifier in the received X2 message is replaced with own node identifier; and/or, the source node IP address in the received X2 message is replaced with own node IP address.

Step 1204-1206: the MR returns a corresponding response message to the initial DeNB after receiving the X2 message; the initial DeNB returns a corresponding response message to the serving DeNB after receiving the response message returned by the MR; and the serving DeNB returns a corresponding response message to the eNB after receiving the response message.

Figure 13:
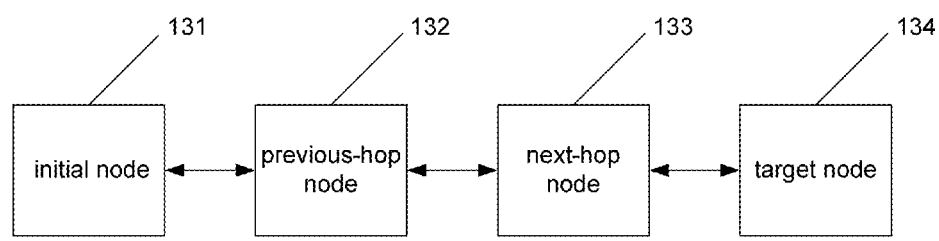
FIG. 13 is a structure diagram of a system for implementing an X2 proxy according to an embodiment of the present disclosure.

In order to implement the method, an embodiment of the present disclosure further provides a system for implementing an X2 proxy, and as shown in FIG. 13, the system includes an initial node 131, a previous-hop node 132, a next-hop node 133 and a target node 134, wherein the initial node 131 is configured to implement X2 message interaction with the target node 134 through more than one X2 proxy including the previous-hop node 132 and the next-hop node 133 of which a function of serving as an X2 proxy of the previous-hop node 132 has been activated.

Here, it should be noted that there is more than one previous-hop node 132 and more than one next-hop node 133.

Wherein, when the function of the next-hop node serving as the X2 proxy of the previous-hop node is activated by including an activation instruction into a message in an X2 connection establishment between the previous-hop node and the next-hop node, the previous-hop node 132 is configured to send an X2 establishment request message containing the activation instruction of activating the function of the next-hop node serving as the X2 proxy of the previous-hop node 132 to the next-hop node 133, and receive an X2 establishment response message from the next-hop node 133; and the next-hop node 133 is configured to return the X2 establishment response message to the previous-hop node 132 after receiving the X2 establishment request message containing the activation instruction of activating the function of the next-hop node serving as the X2 proxy of the previous-hop node 132 from the previous-hop node 132.

Wherein, the X2 establishment response message may contain an X2 proxy activation confirmation instruction.

When the function of the next-hop node serving as the X2 proxy of the previous-hop node is activated by including at the initial node an activation instruction into a message in a handover from the previous-hop node to the next-hop node and the handover is an X2 handover, the previous-hop node 132 is configured to send an X2 handover request message containing the activation instruction of activating the function of the next-hop node serving as the X2 proxy of the previous-hop node 132 to the next-hop node 133, and receive an X2 handover request message returned by the next-hop node 133;

the next-hop node 133 is configured to return the X2 handover response message to the previous-hop node 132 after receiving the X2 handover request message containing the activation instruction of activating the function of the next-hop node serving as the X2 proxy of the previous-hop node from the previous-hop node 132; or, the initial node 131 is further configured to send an RRC connection reconfiguration completion message containing the activation instruction of activating the function of the next-hop node serving as the X2 proxy of the previous-hop node 132 to the next-hop node 133;

the next-hop node 133 is configured to receive the RRC connection reconfiguration completion message containing the activation instruction of activating the function of the next-hop node serving as the X2 proxy of the previous-hop node 132 from the initial node 131.

The next-hop node 133 is further configured to perform message interaction with the previous-hop node 132 to activate own function of serving as the X2 proxy of the previous-hop node 132 after receiving the RRC connection reconfiguration completion message containing the instruction of activating the function of the serving as the X2 proxy of the previous-hop node 132 from the initial node 131.

Wherein, the X2 handover response message may contain the X2 proxy activation confirmation instruction.

When the function of the next-hop node serving as the X2 proxy of the previous-hop node is activated by including at the initial node the activation instruction into the message in the handover from the previous-hop node to the next-hop node and the handover is an S1 handover, the system may further include: a source MME and a target MME, wherein the previous-hop node 132 is configured to send an S1 handover request message containing the activation instruction of activating the function of the next-hop node serving as the X2 proxy of the previous-hop node 132 to the next-hop node 133 sequentially through the source MME and the target MME, and receive an S1 handover response message returned sequentially through the target MME and the source MME from the next-hop node 133;

the next-hop node 133 is configured to return the S1 handover response message to the previous-hop node sequentially through the target MME and the source MME after receiving the S1 handover request message containing the activation instruction of activating the function of the next-hop node serving as the X2 proxy of the previous-hop node 132 and sent by the previous-hop node 132 sequentially through the source MME and the target MME; or, the initial node 131 is further configured to send the RRC connection reconfiguration completion message containing the activation instruction of activating the function of the next-hop node serving as the X2 proxy of the previous-hop node 132 to the next-hop node 133 to activate the function of the next-hop node 133 serving as the X2 proxy of the previous-hop node 132;

the next-hop node 133 is configured to receive the RRC connection reconfiguration completion message containing the activation instruction of activating the function of the next-hop node serving as the X2 proxy of the previous-hop node 132 from the initial node 131.

The next-hop node 133 is further configured to perform message interaction with the previous-hop node 133 to activate own function of serving as the X2 proxy of the previous-hop node 132 after receiving the RRC connection reconfiguration completion message containing the activation instruction of activating the function of the next-hop node serving as the X2 proxy of the previous-hop node 132 from the initial node 131.

Wherein, the S1 handover response message may contain the X2 proxy activation confirmation instruction.

When the function of the next-hop node serving as the X2 proxy of the previous-hop node is activated by including an activation instruction into a message in an evolved Node B (eNB) configuration update performed by the previous-hop node and the next-hop node, the previous-hop node 132 is configured to send an eNB configuration updating message containing the activation instruction of activating the function of the next-hop node serving as the X2 proxy of the previous-hop node 132 to the next-hop node 133, and receive an eNB configuration updating confirmation message or an eNB configuration updating failure message from the next-hop node 133; and the next-hop node 133 is configured to return the eNB configuration updating confirmation message or the eNB configuration updating failure message to the previous-hop node 132 after receiving the eNB configuration updating message containing the activation instruction of activating the function of the next-hop node serving as the X2 proxy of the previous-hop node 132 from the previous-hop node 132.

Wherein, the eNB configuration updating confirmation message may contain the X2 proxy activation confirmation instruction; and the eNB configuration updating failure message may contain the X2 proxy activation confirmation instruction.

When the function of the next-hop node 133 serving as the X2 proxy of the previous-hop node 132 is deactivated, the previous-hop node 132 is further configured to send an X2 proxy releasing/deactivation request message containing a deactivation instruction of deactivating the function of the next-hop node serving as the X2 proxy of the previous-hop node 132 to the next-hop node 133 to deactivate the function of the next-hop node 133 serving as the X2 proxy of the previous-hop node 132;

the next-hop node 133 is further configured to receive the X2 proxy releasing/deactivation request message containing the deactivation instruction of deactivating the function of the next-hop node serving as the X2 proxy of the previous-hop node 132 from the previous-hop node 132; or, the previous-hop node 132 is further configured to send an eNB configuration updating message containing the deactivation instruction of deactivating the function of the next-hop node serving as the X2 proxy of the previous-hop node 132 to the next-hop node 133, and receive an eNB configuration updating confirmation message or an eNB configuration updating failure message from the next-hop node 133;

the next-hop node 133 is further configured to return the eNB configuration updating confirmation message or the eNB configuration updating failure message to the previous-hop node 132 after receiving the eNB configuration updating message containing the deactivation instruction of deactivating the function of the next-hop node serving as the X2 proxy of the previous-hop node 132 from the previous-hop node 132.

The next-hop node 133 is further configured to return an X2 proxy releasing/deactivation response message to the previous-hop node 132 after receiving the X2 proxy releasing/deactivation request message containing the deactivation instruction of deactivating the function of the next-hop node serving as the X2 proxy of the previous-hop node 132 from the previous-hop node 132;

the previous-hop node 132 is further configured to receive the X2 proxy releasing/deactivation response message from the next-hop node 133, wherein the X2 proxy releasing/deactivation response message may contain an X2 proxy deactivation confirmation instruction;

the eNB configuration updating confirmation message may contain the X2 proxy deactivation confirmation instruction; and the eNB configuration updating failure message may contain the X2 proxy deactivation confirmation instruction.

Those skilled in the art should understand that the embodiments of the present disclosure may provide a method, a system or a computer program product. Therefore, the present disclosure may adopts a hardware embodiment, software embodiment or an embodiment combining software and hardware. Moreover, the present disclosure may be in a form of a computer program product implemented on one or more computer-available storage media (including, but not limited to, a disk memory, an optical memory and the like) including computer-available program codes.

The present disclosure is described with reference to flowcharts and/or block diagrams of the method, the equipment (system) and the computer program product according to the embodiment of the present disclosure. It should be understood that each flow and/or block diagram in the flowcharts and/or the block diagrams and combinations of the flows and/or block diagrams in the flowcharts and/or the block diagrams may be implemented by computer program instructions. These computer program instructions may be provided to a universal computer, a special computer, an embedded processor or a processor of other programmable data processing equipment so as to generate a machine, so that a device for realizing functions specified in one or more flows in the flowcharts and/or one or more block diagrams in the block diagrams is generated by the instructions executed by the computers or the processor of the other programmable data processing equipment.

These computer program instructions may also be stored in a computer-readable memory capable of guiding the computers or the other programmable data processing equipment to work in a specific manner, so that a product including an instruction device may be generated by the instructions stored in the computer-readable memory, and the instruction device realizes the functions specified in one or more flows in the flowcharts and/or one or more block diagrams in the block diagrams.

These computer program instructions may further be loaded to the computers or the other programmable data processing equipment, and then a series of operating steps are executed on the computers or the other programmable equipment to implement processing implemented by the computers, so that steps for realizing the functions specified in one or more flows in the flowcharts and/or one or more block diagrams in the flowcharts are provided by the instructions executed on the computers or the other programmable equipment.

The above are only the preferred embodiments of the present disclosure and not intended to limit the scope of protection of the present disclosure.

What is claimed is:

1. A method for implementing an X2 proxy, comprising:
activating a function of a next-hop node serving as an X2 proxy of a previous-hop node; and
implementing X2 message interaction between an initial node and a target node through more than one X2 proxy including the previous-hop node and the next-hop node,
wherein the step of activating the function of the next-hop node serving as the X2 proxy of the previous-hop node comprises:
activating the function of the next-hop node serving as the X2 proxy of the previous-hop node by including at the initial node an activation instruction into a message in a handover from the previous-hop node to the next-hop node,
wherein when the handover is an X2 handover, activating the function of the next-hop node serving as the X2 proxy of the previous-hop node by including at the initial node the activation instruction into the message in the handover from the previous-hop node to the next-hop node comprises:
sending, by the previous-hop node, an X2 handover request message containing the activation instruction of activating the function of the next-hop node serving as the X2 proxy of the previous-hop node to the next-hop node;
returning, by the next-hop node, an X2 handover response message to the previous-hop node after receiving the X2 handover request message; or, sending, by the initial node, a Radio Resource Control (RRC) connection reconfiguration completion message containing the activation instruction of activating the function of the next-hop node serving as the X2 proxy of the previous-hop node to the next-hop node.

2. The method according to claim 1, wherein
the X2 handover response message contains an X2 proxy activation confirmation instruction.

3. The method according to claim 1, wherein the step of implementing X2 message interaction between the initial node and the target node through more than one X2 proxy including the previous-hop node and the next-hop node comprises:
sending, by the initial node, an X2 message to a first-hop node;
performing, by the first-hop node, X2 proxy processing on the received X2 message, sending a corresponding X2 message to a second-hop node, and finishing the rest operation by analogy until a last-hop node performs X2 proxy processing on a received X2 message and sends a corresponding X2 message to the target node; and/or,
performing, by the last-hop node, X2 proxy processing on an X2 message received from the target node, sending a corresponding X2 message to a last-second hop node, and finishing the rest operation by analogy until the first-hop node performs X2 proxy processing on a received X2 message and sends a corresponding X2 message to the initial node.

4. The method according to claim 3, wherein the step of performing X2 proxy processing on the received X2 message comprises:
allocating a new application layer identifier to User Equipment (UE), and replacing an application layer identifier of the UE in the received X2 message with the allocated application layer identifier; and/or,
replacing a source node identifier in the received X2 message with own node identifier; and/or,
replacing a source node Internet Protocol (IP) address in the received X2 message with own node IP address.

5. The method according to claim 1, wherein types of the target node comprise an eNB, a Relay Node (RN), a Mobile Relay (MR), a Home evolved Node B and a micro eNB.

6. The method according to claim 1, further comprising:
deactivating the function of the next-hop node serving as the X2 proxy of the previous-hop node.

7. The method according to claim 6, wherein the step of deactivating the function of the next-hop node serving as the X2 proxy of the previous-hop node comprises:
sending, by the previous-hop node, an X2 proxy releasing/deactivation request message containing a deactivation instruction of deactivating the function of the next-hop node serving as the X2 proxy of the previous-hop node to the next-hop node; or,
deactivating the function of the next-hop node serving as the X2 proxy of the previous-hop node by including the deactivation instruction into a message in the eNB configuration update performed by the previous-hop node and the next-hop node.

8. The method according to claim 7, further comprising:
returning, by the next-hop node, an X2 proxy releasing/deactivation response message to the previous-hop node after receiving the X2 proxy releasing/deactivation request message containing the deactivation instruction of deactivating the function of the next-hop node serving as the X2 proxy of the previous-hop node; or, the step of deactivating the function of the next-hop node serving as the X2 proxy of the previous-hop node by including the deactivation instruction into the message in the eNB configuration update performed by the previous-hop node and the next-hop node comprises:
sending, by the previous-hop node, an eNB configuration updating message containing the deactivation instruction of deactivating the function of the next-hop node serving as the X2 proxy of the previous-hop node to the next-hop node; and
returning, by the next-hop node, an eNB configuration updating confirmation message or an eNB configuration updating failure message to the previous-hop node after receiving the eNB configuration updating message.

9. The method according to claim 8, wherein
the X2 proxy releasing/deactivation response message contains an X2 proxy deactivation confirmation instruction; or,
the eNB configuration updating confirmation message contains an X2 proxy deactivation confirmation instruction;
the eNB configuration updating failure message contains an X2 proxy deactivation confirmation instruction.

10. A system for implementing an X2 proxy, comprising an initial node, a previous-hop node, a next-hop node and a target node, wherein
the initial node is configured to implement X2 message interaction with the target node through more than one X2 proxy including the previous-hop node and the next-hop node of which a function of serving as an X2 proxy of the previous-hop node has been activated,
when the function of the next-hop node serving as the X2 proxy of the previous-hop node is activated by including at the initial node an activation instruction into a message in a handover from the previous-hop node to the next-hop node and the handover is an X2 handover, the previous-hop node is configured to send an X2 handover request message containing the activation instruction of activating the function of the next-hop node serving as the X2 proxy of the previous-hop node to the next-hop node, and receive an X2 handover request message returned by the next-hop node; the next-hop node is configured to return the X2 handover response message to the previous-hop node after receiving from the previous-hop node the X2 handover request message containing the activation instruction of activating the function of the next-hop node serving as the X2 proxy of the previous-hop node; or, the initial node is further configured to send a Radio Resource Control (RRC) connection reconfiguration completion message containing the activation instruction of activating the function of the next-hop node serving as the X2 proxy of the previous-hop node to the next-hop node; the next-hop node is configured to receive from the initial node the RRC connection reconfiguration completion message containing the activation instruction of activating the function of the next-hop node serving as the X2 proxy of the previous-hop node.

11. The system according to claim 10, wherein
the X2 handover response message contains an X2 proxy activation confirmation instruction.

12. The system according to claim 10, wherein, when the function of the next-hop node serving as the X2 proxy of the previous-hop node is deactivated, the previous-hop node is further configured to send an X2 proxy releasing/deactivation request message containing a deactivation instruction of deactivating the function of the next-hop node serving as the X2 proxy of the previous-hop node to the next-hop node;
  the next-hop node is further configured to receive from the previous-hop node the X2 proxy releasing/deactivation request message containing the deactivation instruction of deactivating the function of the next-hop node serving as the X2 proxy of the previous-hop node; or,
  the previous-hop node is further configured to send an eNB configuration updating message containing the deactivation instruction of deactivating the function of the next-hop node serving as the X2 proxy of the previous-hop node to the next-hop node, and receive an eNB configuration updating confirmation message or an eNB configuration updating failure message from the next-hop node;
  the next-hop node is further configured to return the eNB configuration updating confirmation message or the eNB configuration updating failure message to the previous-hop node after receiving from the previous-hop node the eNB configuration updating message containing the deactivation instruction of deactivating the function of the next-hop node serving as the X2 proxy of the previous-hop node.

13. The system according to claim 12, wherein
  the next-hop node is further configured to return an X2 proxy releasing/deactivation response message to the previous-hop node; and
  the previous-hop node is further configured to receive the X2 proxy releasing/deactivation response message from the next-hop node.

14. A non-transitory computer storage medium, comprising a group of instructions, wherein at least one processor is caused to execute the method for implementing an X2 proxy which comprises steps of:

activating a function of a next-hop node serving as an X2 proxy of a previous-hop node; and
  implementing X2 message interaction between an initial node and a target node through more than one X2 proxy including the previous-hop node and the next-hop node,
  wherein the step of activating the function of the next-hop node serving as the X2 proxy of the previous-hop node comprises:
  activating the function of the next-hop node serving as the X2 proxy of the previous-hop node by including at the initial node an activation instruction into a message in a handover from the previous-hop node to the next-hop node,
  wherein when the handover is an X2 handover, activating the function of the next-hop node serving as the X2 proxy of the previous-hop node by including at the initial node the activation instruction into the message in the handover from the previous-hop node to the next-hop node comprises:
  sending, by the previous-hop node, an X2 handover request message containing the activation instruction of activating the function of the next-hop node serving as the X2 proxy of the previous-hop node to the next-hop node;
  returning, by the next-hop node, an X2 handover response message to the previous-hop node after receiving the X2 handover request message; or,
  sending, by the initial node, a Radio Resource Control (RRC) connection reconfiguration completion message containing the activation instruction of activating the function of the next-hop node serving as the X2 proxy of the previous-hop node to the next-hop node.

* * * * *